(12) United States Patent
Bowers (10) Patent No.: US 7,896,771 B2
(45) Date of Patent: Mar. 1, 2011

(54) DIFFERENTIAL LOCK MECHANISM

(75) Inventor: Lee N. Bowers, Springfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 593 days.

(21) Appl. No.: 12/047,583

(22) Filed: Mar. 13, 2008

(65) Prior Publication Data
US 2009/0233752 A1 Sep. 17, 2009

(51) Int. Cl.
*F16H 48/06* (2006.01)
(52) U.S. Cl. .......................... 475/231; 475/237
(58) Field of Classification Search ............ 475/231, 475/237, 240, 241, 249, 250
See application file for complete search history.

(56) References Cited

U.S. PATENT DOCUMENTS

| | | | |
|---|---|---|---|
| 1,464,795 A * | 8/1923 | Woodward | 475/237 |
| 1,494,457 A * | 5/1924 | Woodward | 475/241 |
| 1,704,861 A | 3/1929 | Lewis | |
| 3,916,728 A | 11/1975 | Behar et al. | |
| 4,043,224 A | 8/1977 | Quick | |
| 4,245,525 A | 1/1981 | LeBegue | |
| 4,498,355 A | 2/1985 | Schou | |
| 4,845,831 A | 7/1989 | Schou | |
| 5,273,499 A * | 12/1993 | Friedl et al. | 475/241 |
| 6,394,927 B1 | 5/2002 | Bongard | |
| 6,533,698 B1 | 3/2003 | Yamada | |
| 6,554,732 B1 | 4/2003 | Sommer | |
| 7,018,317 B2 | 3/2006 | Tweet et al. | |
| 7,527,575 B2 * | 5/2009 | Salg et al. | 475/231 |
| 2006/0247087 A1 * | 11/2006 | Pontanari et al. | 475/231 |

FOREIGN PATENT DOCUMENTS

JP 63247122 A * 10/1988

* cited by examiner

*Primary Examiner* — Roger Pang
(74) *Attorney, Agent, or Firm* — Ulmer & Berne LLP (57) ABSTRACT

A differential lock mechanism is provided for use in an axle assembly having a differential, an input member and first and second axles. A lock sleeve is co-axially disposed about the first axle, with the lock sleeve being rotatable with the first axle and laterally movable relative to the first axle. A lock collar is co-axially disposed about the lock sleeve and is laterally movable between outboard and inboard positions. A biasing member biases the lock sleeve toward the rotatable carrier and a lock fork is engaged with the lock collar. The lock fork is operable for moving the lock collar between the outboard and inboard positions. The lock collar is disengaged with the rotatable carrier when the lock collar is in the outboard position and is engaged with both the rotatable carrier and the lock sleeve when the lock collar is in the inboard position.

21 Claims, 7 Drawing Sheets

DIFFERENTIAL LOCK MECHANISM

TECHNICAL FIELD

Differential lock mechanisms are provided for use in axle assemblies of motor vehicles.

BACKGROUND

Various motor vehicle differentials are known in the art. Differentials in two wheel drive vehicles are used to transfer torque from a driveshaft of a vehicle to a pair of driven wheels of the vehicle, for example the left and right rear wheels of the vehicle. The differential permits the two wheels to rotate at the same speed when the vehicle is traveling straight on a roadway and also permits the two wheels to rotate at different speeds as required when the vehicle is turning or when traction is reduced at one of the driven wheels.

In some instances it is desirable to lock the differential to prevent the two wheels from rotating at different speeds. For example, if one of the wheels loses traction and spins due to operation on a slippery surface such as ice, snow, sand, mud etc., the opposite wheel will lose torque in proportion to the traction lost by the spinning wheel. Consequently, the wheel opposite the spinning wheel may remain motionless and the vehicle is not propelled. Various devices are known that resolve this problem including differential locks.

One known differential lock mechanism is incorporated into an axle assembly subsequently described with reference to Prior Art FIG. 10. The differential lock mechanism includes a lock collar that is movable between outboard and inboard positions. In the outboard position, the lock collar is splined to one of the axles of the axle assembly but is disengaged from the differential of the axle assembly so that the two driven wheels of the vehicle incorporating the axle assembly are free to rotate at different speeds. In the inboard position, the lock collar is splined to the axle and a rotatable carrier of the differential, which locks the differential. This prevents the two driven axles from rotating at different speeds during operation of the vehicle.

SUMMARY

A differential lock mechanism is provided for use in an axle assembly having a differential, an input member and first and second axles. The differential further includes a stationary case and a rotatable carrier journalled within the stationary case. The rotatable carrier is coupled to the input member and the first and second axles. The differential lock mechanism includes a lock sleeve co-axially disposed about the first axle, with the lock sleeve being laterally movable relative to the first axle and rotatable with the first axle. The differential lock mechanism also includes a lock collar co-axially disposed about the lock sleeve, with the lock collar being laterally movable relative to the lock sleeve between outboard and inboard positions. The differential lock mechanism also includes a biasing member effective for biasing the lock sleeve toward the rotatable carrier and a lock fork engaged with the lock collar. The lock fork is operable for moving the lock collar between the outboard and inboard positions. The lock collar is disengaged with the rotatable carrier when the lock collar is in the outboard position. The lock sleeve, the first axle and the second axle are free to rotate relative to the rotatable carrier when the lock collar is in the outboard position. The lock collar is engaged with both the rotatable carrier and the lock sleeve when the lock collar is in the inboard position. The lock sleeve, the first axle, the second axle and the rotatable carrier are operably rotatable at the same speed when the lock collar is in the inboard position.

An axle assembly is provided that includes an input member and first and second axles. The axle assembly also includes a differential coupled with the input member and the first and second axles. The differential is operable for transferring torque from the input member to the first and second axles. The differential includes a stationary case and a rotatable carrier journalled within the stationary case. The axle assembly further includes a differential lock mechanism that includes a lock sleeve co-axially disposed about the first axle. The lock sleeve is laterally movable relative to the first axle and rotatable with the first axle. The differential also includes a lock collar co-axially disposed about the lock sleeve. The lock collar is laterally movable relative to the lock sleeve between outboard and inboard positions. The axle assembly further includes a biasing member effective for biasing the lock sleeve toward the rotatable carrier and a lock fork engaged with the lock collar. The lock fork is operable for moving the lock collar between the outboard and inboard positions. The lock collar is disengaged with the rotatable carrier when the lock collar is in the outboard position. The lock sleeve, the first axle and the second axle are free to rotate relative to the rotatable carrier when the lock collar is in the outboard position. The lock collar is engaged with both the rotatable carrier and the lock sleeve when the lock collar is in the inboard position. The lock sleeve, the first and second axles and the rotatable carrier are operably rotatable at the same speed when the lock collar is in the inboard position.

According to another embodiment, an axle assembly is provided that includes first and second axles and a differential coupled with the first and second axles. The differential includes a stationary case and a rotatable carrier journalled within the stationary case. The axle assembly further includes a differential lock mechanism that includes a lock sleeve co-axially disposed about the first axle. The lock sleeve is laterally movable relative to the first axle and rotatable with the first axle. The axle assembly also includes a lock collar co-axially disposed about the lock sleeve. The lock collar is laterally movable relative to the lock sleeve between outboard and inboard positions. The axle assembly further includes a biasing member effective for biasing the lock sleeve toward the rotatable carrier and a lock fork engaged with the lock collar. The lock fork is operable for moving the lock collar between the outboard and inboard positions. The lock collar is disengaged with the rotatable carrier when the lock collar is in the outboard position and the lock collar is engaged with both the rotatable carrier and the lock sleeve when the lock collar is in the inboard position.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
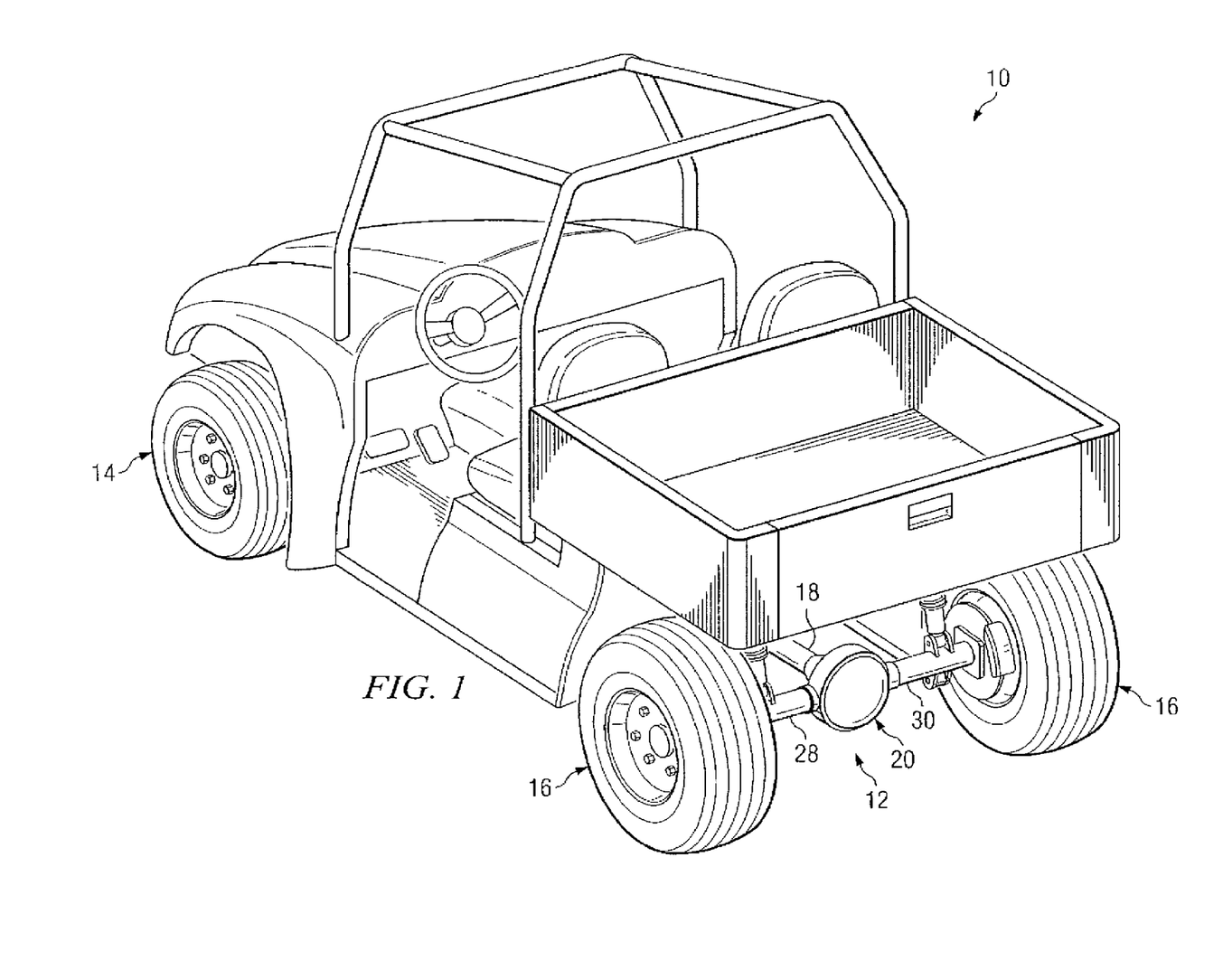
FIG. 1 is a left rear perspective view of a vehicle incorporating an axle assembly.

Referring to the drawings, wherein like reference numbers indicate the same or corresponding elements throughout the views, FIG. 1 illustrates a vehicle 10 that can incorporate a rear axle assembly 12 according to one embodiment. The rear axle assembly 12 can be used on a small utility vehicle, such as vehicle 10 shown in FIG. 1 and can also be used on a variety of other vehicles including all terrain vehicles, golf carts, "dune buggies", automobiles and trucks.

Vehicle 10 includes two front wheels 14 (one shown) and two rear wheels 16. Vehicle 10 also includes a source of motive power (not shown) and a drivetrain, which includes a driveshaft 18 and the rear axle assembly 12, for transferring torque from the source of motive power to the rear wheels 16. The source of motive power can be an internal combustion engine, which can use one or more of a variety of fuels, an electric motor or any other suitable source of motive power.

Figure 2:
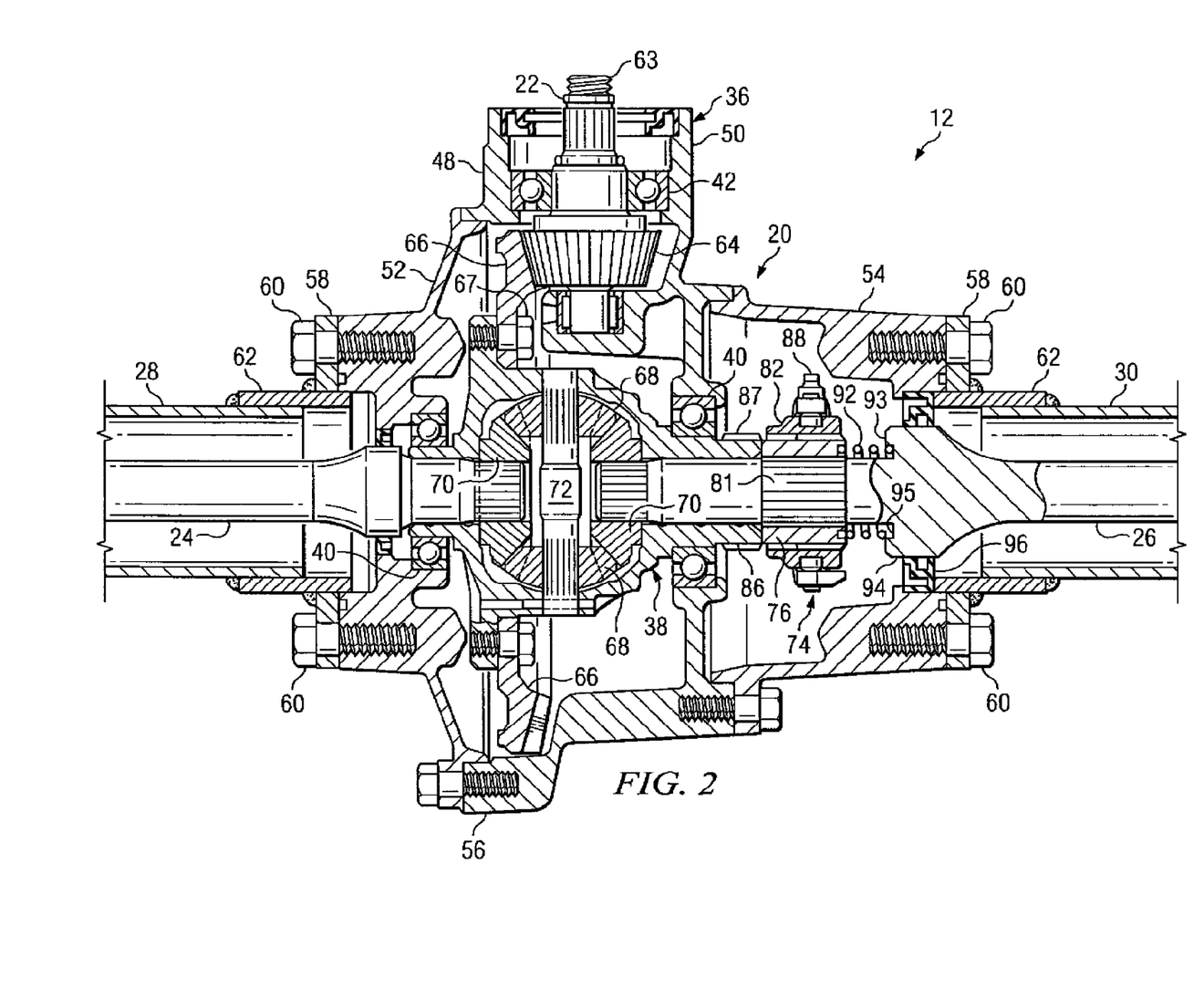
FIG. 2 is a cross-sectional view of the axle assembly shown schematically in FIG. 1, according to one embodiment, with a lock collar of a differential lock mechanism of the axle assembly in an outboard position, wherein the left and right rear axles of the axle assembly are free to rotate at different speeds.
Figure 3:
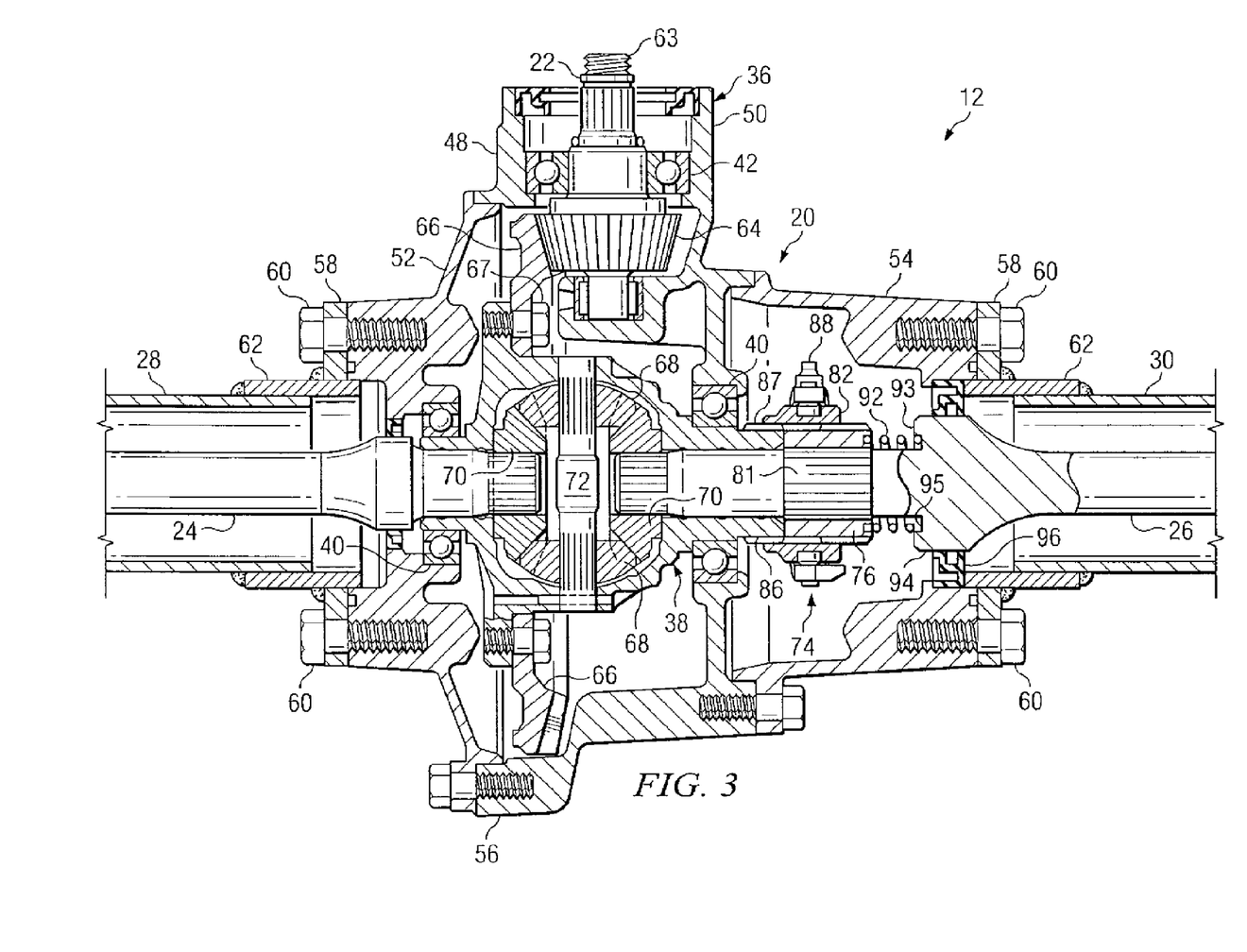
FIG. 3 is a cross-sectional view similar to FIG. 2, but with the lock collar in an inboard position, wherein the left and right rear axles are prevented from rotating at different speeds.

Referring to FIGS. 1-3, the rear axle assembly 12 can include a differential 20, an input member 22 that can be coupled to the driveshaft 18, a rotatable axle 24 and a rotatable axle 26. Some components of axle assembly 12 are shown in elevation in FIGS. 2 and 3 for clarity of illustration, and axle assembly 12 is shown schematically in FIG. 1. Axle 24 can be a left rear rotatable axle and axle 26 can be a right rear rotatable axle. Left rear axle 24 can be disposed within a stationary tube 28 and the right rear axle 26 can be disposed within a stationary axle tube 30 as shown in FIGS. 2 and 3. Axles 24 and 26 can be rotatably coupled with respective ones of the rear wheels 16 in a manner known in the art. During operation of vehicle 10, differential 20 transfers torque from the input member 22 to the left rear axle 24 and the right rear axle 26.

The differential 20 includes a stationary case 36 and a rotatable carrier 38 that can be journalled within stationary case 36 by a pair of bearings 40. The carrier 38 is rotatably coupled with input member 22 and left 24 and right 26 rear axles, as subsequently described in greater detail. The input member 22 is journalled within the stationary case 36 by a bearing 42.

The stationary case 36 can include multiple members. For example, the stationary case 36 can include members 48 and 50 that cooperate to define an opening suitable to permit input member 22 to extend through stationary case 36. The bearing 42 can be positioned between input member 22 and both of the members 48 and 50 of stationary case 36. Stationary case can also include a member 52 which journals the left one of bearings 40 and members 54 and 56, which can be connected to one another. Members 50 and 56 cooperate to journal the right one of bearings 40.

Differential 20 can include a pair of covers 58. The covers 58 can be fastened to the stationary case 36 using conventional fasteners such as bolts 60. The differential 20 can also include a pair of sleeves 62, with one of the sleeves 62 co-axially disposed about axle tube 28 and secured to axle tube 28, for example by welding. The other sleeve 62 can be co-axially disposed about the axle tube 30 and secured to axle tube 30, for example by welding.

The input member 22 can be coupled at a first end 63 to the drive shaft 18. The opposite end of input member 22 can include a pinion gear 64 that meshes with a ring gear 66 that can be secured to the rotatable carrier 38 by conventional fasteners such as a plurality of bolts (e.g., bolts 67). Accordingly, during operation of vehicle 10, rotation of driveshaft 18 causes the rotatable carrier 38 to rotate. The differential 20 further includes a set of differential gears that can include a plurality of spider gears 68 and a pair of side gears 70. The spider gears 68 are secured to a shaft 72 which is secured to the rotatable carrier 38. Accordingly, spider gears 68 are rotatable with the rotatable carrier 38. Each spider gear 68 meshes with both of the side gears 70.

As shown in FIGS. 2 and 3, one of the side gears 70 is secured to an inboard end of the right rear axle 26, while the other side gear 70 is secured to an inboard end of the left rear axle 24. The side gears 70 can be splined to the respective one of the axles 24, 26. Accordingly, it may be appreciated that rotation of the rotatable carrier 38 causes the axles 24 and 26 to rotate, which in turn rotates the rear wheels 16. As known in the art, when differential 20 is unlocked, spider gears 68 cooperate with the side gears 70 so that the axles 24 and 26 can rotate at the same speed when vehicle 10 is traveling straight on a roadway and also cooperate to permit axles 24 and 26 to rotate at different speeds as required when vehicle 10 is turning or when traction is reduced at one of the rear wheels 16.

Axle assembly 12 further includes a differential lock mechanism, indicated generally at 74. The differential lock mechanism 74 permits the operator of vehicle 10 to selectively lock differential 20 to prevent the left rear axle 24 and the right rear axle 26 from rotating relative to one another, and accordingly, to prevent the two rear wheels 16 from rotating relative to one another. This can be desirable in certain instances, for example when one of the rear wheels 16 is spinning due to engagement with a slippery surface such as ice, snow, sand, mud etc.

Figure 4:
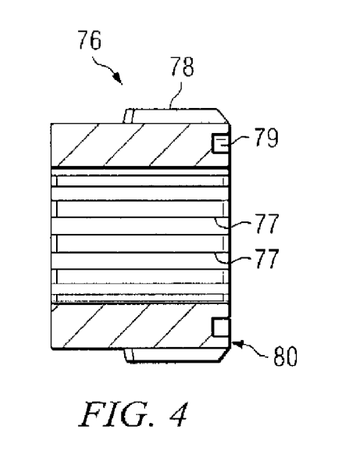
FIG. 4 is an enlarged cross-sectional view of the lock sleeve shown in FIGS. 2 and 3.

The differential lock mechanism 74 can include a lock sleeve 76 (FIGS. 2-4) having a plurality of circumferentially spaced internal splines 77 and a plurality of circumferentially spaced external splines 78. The lock sleeve 76 can also include an annular groove 79 formed in an outboard end 80 of the lock sleeve 76. The lock sleeve 76 can be co-axially disposed about the right rear axle 26. In other embodiments (not shown), the differential lock mechanism 74 can be associated with the left rear axle 24. Additionally, it will be appreciated that in other vehicles having a front differential and driven front wheels, the differential lock mechanism 74 can be associated with either one of the driven front axles.

Figure 5:
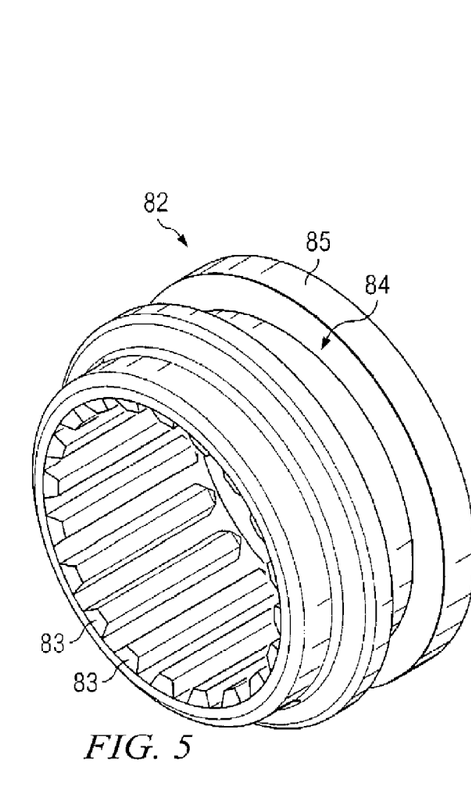
FIG. 5 is an enlarged perspective view of the lock collar shown in FIGS. 2 and 3.

Lock sleeve 76 can be splined to axle 26, with the internal splines 77 of lock sleeve 76 meshed with external splines 81 of axle 26. Accordingly, lock sleeve 76 is laterally movable relative to axle 26 and is rotatable with axle 26. The differential lock mechanism 74 can also include a lock collar 82 (FIGS. 2, 3 and 5) that is co-axially disposed about the lock sleeve 76. Lock collar 82 can include a plurality of circumferentially spaced internal splines 83 and an annular groove 84 formed in an outer surface 85 of the lock collar 82.

Figure 6:
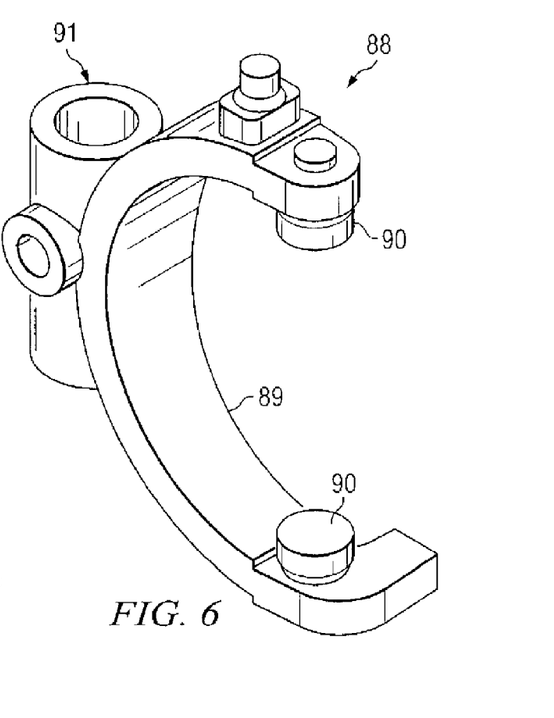
FIG. 6 is an enlarged perspective of the lock fork shown in FIGS. 2 and 3.

The rotatable carrier 38 can include a hollow sleeve 86 that is sized to receive the right rear axle 26. The sleeve 86 of the rotatable carrier 38 can include a plurality of circumferentially spaced external splines 87. Lock collar 82 is laterally movable relative to the lock sleeve 76 of the differential lock mechanism 74 and the sleeve 86 of the rotatable carrier 38 between an outboard position shown in FIG. 2 and an inboard position shown in FIG. 3. Lock collar 82 can be moved between the outboard and inboard positions by a lock fork 88 (FIGS. 2, 3 and 6) that engages lock collar 82 as shown in FIGS. 2 and 3. As shown in FIG. 6, lock fork 88 includes a circumferentially extending member 89 that can extend partially around the lock collar 82. For example, in one embodiment the circumferentially extending member 89 can encircle about one-half of the circumference of lock collar 82.

The lock fork 88 can further include a plurality of radially inwardly extending protrusions 90 (FIG. 6), that extend radially inwardly from member 89. Protrusions 90 can be disposed within the circumferentially extending groove 84 of lock collar 82. Lock fork 88 can also include an attachment member 91 that is connected to a linear actuator device (not shown). The linear actuator device can include a Bowden-type cable secured to the attachment member 91 and/or other conventional linear actuators such as pneumatic, hydraulic or electrical actuators, for example. The lock fork 88 and lock collar 82 can be moved between the outboard position shown in FIG. 2 and the inboard position shown in FIG. 3 by the linear actuator device.

Differential lock mechanism 74 also includes a biasing member 92 that can be disposed between lock sleeve 76 and an inboard-facing surface 93 of a shoulder 94 of the rotatable axle 26. An inboard end of the biasing member 92 can be disposed at least partially in the groove 79 formed in the lock sleeve 76 and an outboard end of the biasing member 92 can be disposed at least partially within a groove 95 formed in the inboard-facing surface 93 of shoulder 94 of axle 26. In other embodiments, a lock sleeve and/or axle might not be provided with a groove for receiving a spring. The biasing member 92 is sized to urge the lock sleeve 76 toward sleeve 86 of the rotatable carrier 38. The lock sleeve 76 can be disposed in contacting engagement with the sleeve 86 of the rotatable carrier 38 as shown in FIGS. 2 and 3. The biasing member 92 can be co-axially disposed about the axle 26. In one embodiment, the biasing member 92 can be a coil spring as shown in FIGS. 2 and 3. In other embodiments (not shown), biasing member 92 can be other types of resilient members, for example a disc spring such as a Belleville washer.

Differential 20 can include an annular seal 96 that can be disposed between axle 26 and the stationary case 36 of differential 20. In one embodiment, seal 96 can be disposed between the shoulder 94 of axle 26 and the stationary case 36 as shown in FIGS. 2 and 3. Seal 96 is effective for retaining, or at least substantially retaining, lubricating fluid disposed within differential 20. Biasing member 92 can be inboard of seal 96 as shown in FIGS. 2 and 3.

When lock collar 82 is in the outboard position shown in FIG. 2, lock collar 82 is engaged with lock sleeve 76 for rotation with lock sleeve 76, but is disengaged from the rotatable carrier 38. When lock collar 82 is in the outboard position, the internal splines 83 of lock collar 82 are meshed with the external splines 78 of lock sleeve 76. Also, when lock collar 82 is in the outboard position shown in FIG. 2, the differential 20 is "unlocked" and the lock sleeve 76, the right rear axle 26 and the left rear axle 24 are free to rotate relative to the rotatable carrier 38 of differential 20. The axles 24 and 26 are also free to rotate relative to one another.

When lock collar 82 is in the inboard position shown in FIG. 3, lock collar 82 is engaged with both the lock sleeve 76 and the sleeve 86 of the rotatable carrier 38. In this position, the internal splines 83 of lock collar 82 are meshed with the external splines 78 of lock sleeve 76 and are also meshed with external splines 87 of the sleeve 86 of the rotatable carrier 38, which locks differential 20. Accordingly, when the lock collar 82 is in the inboard position shown in FIG. 3, lock sleeve 76, rotatable carrier 38 and axle 26 rotate at the same speed when vehicle 10 is in operation. Additionally, when lock collar 82 is in the inboard position, the left rear axle 24 is prevented from rotating relative to rotatable carrier 38 and the right rear axle 26. Consequently, axles 26 and 28 and both of the rear wheels 16 rotate at the same speed during operation of vehicle 10, when the lock collar 82 is in the inboard position shown in FIG. 3 and differential 20 is locked.

Figure 7:
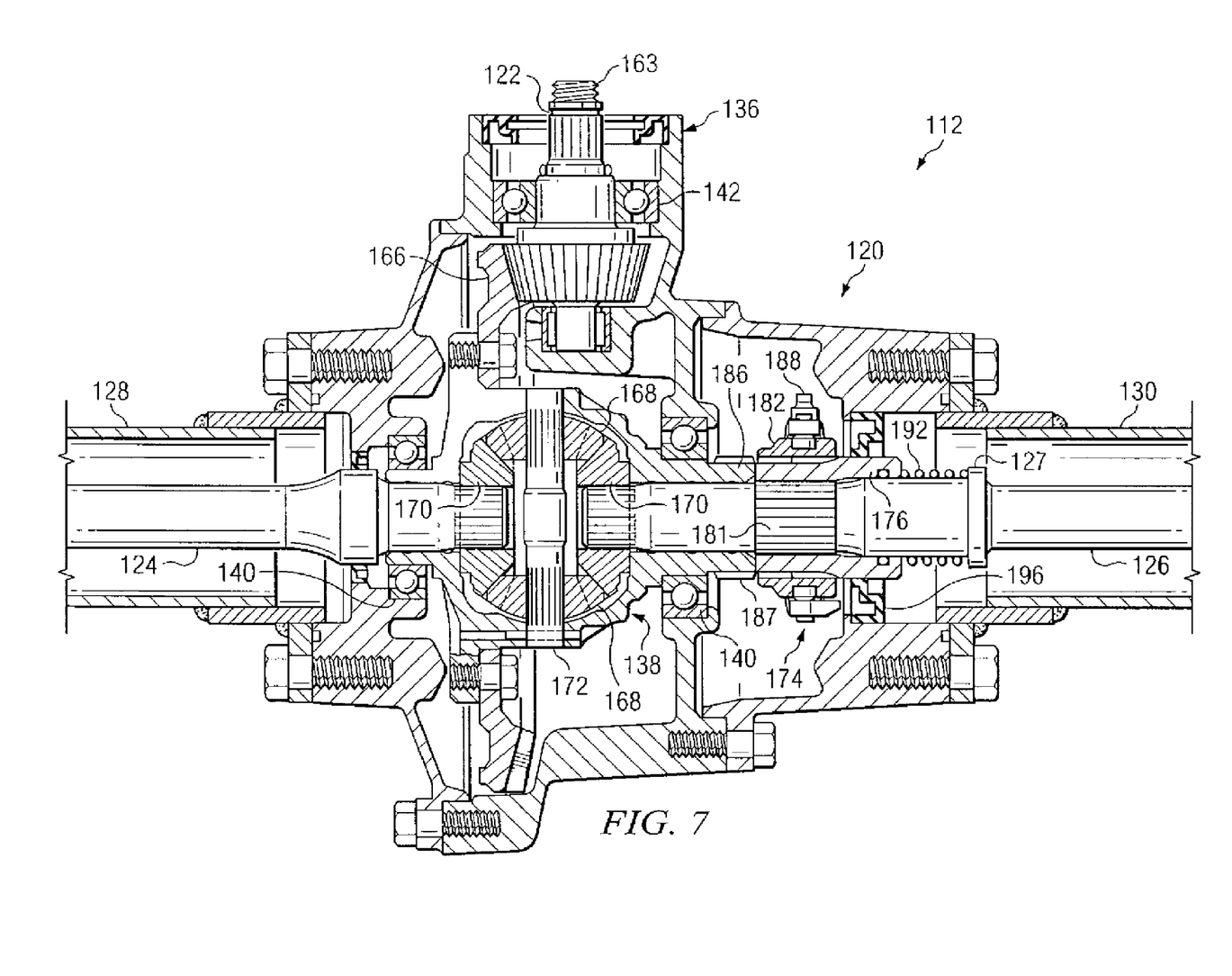
FIG. 7 is a cross-sectional view of an axle assembly according to another embodiment with a lock collar of a differential lock mechanism of the axle assembly in an outboard position, wherein the left and right rear axles of the axle assembly are free to rotate at different speeds.
Figure 8:
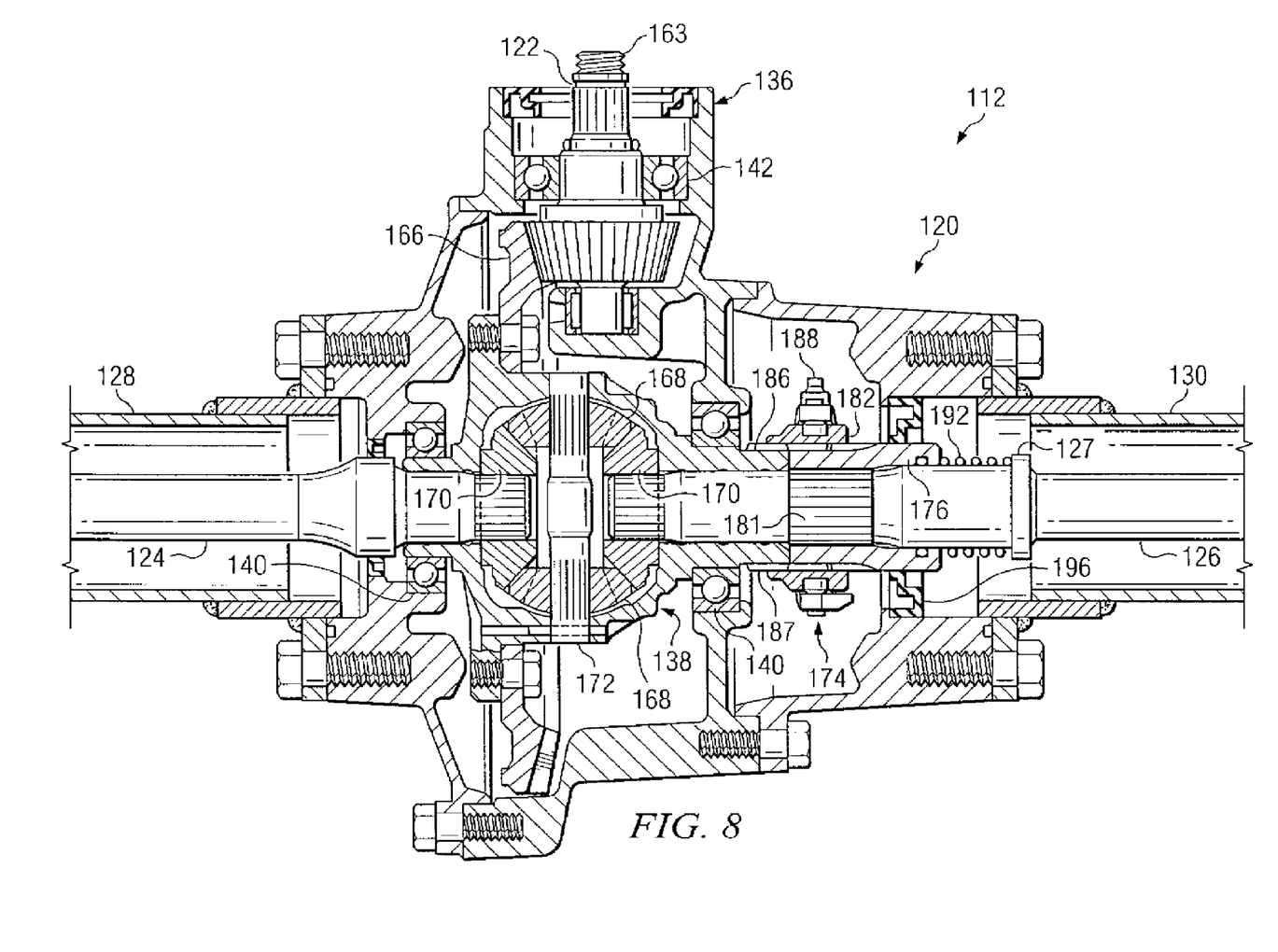
FIG. 8 is a cross-sectional view similar to FIG. 7, but with the lock collar in an inboard position, wherein the left and right rear axles are prevented from rotating at different speeds.

FIGS. 7 and 8 illustrate an axle assembly 112 according to another embodiment. Some components of axle assembly 112 are shown in elevation in FIGS. 7 and 8 for clarity of illustration. Axle assembly 112 can be a rear axle assembly of a vehicle. Axle assembly 112 can be similar to, or the same as, axle assembly 12 in many respects as shown in FIGS. 7 and 8. For example, axle assembly 112 includes a differential 120, an input member 122 that can be coupled, at an end 163, to a driveshaft. The axle assembly 112 also includes rotatable axles 124 and 126 that can be disposed within axle tubes 128 and 130, respectively. The differential 120 includes a stationary case 136 and a rotatable carrier 138 that can be journalled within the stationary case 136 by a pair of bearings 140. Input member 122 can be journalled within stationary case 136 by a bearing 142. Torque can be transferred from a vehicle driveshaft to axles 24 and 26 via input member 122, ring gear 166, pinion gears 168 which can be secured to rotatable carrier 138 via shaft 172, and side gears 170 which are secured to respective ones of the axles 124 and 126.

However, axle assembly 112 differs from axle assembly 12 as subsequently described. Axle assembly 112 includes a differential lock mechanism 174 that includes a lock sleeve 176, a lock collar 182, a lock fork 188 and a biasing member 192. Axle assembly 112 can include a seal 196 that is disposed radially between the lock sleeve 176 and a stationary case 136 of differential 120, which differs from axle assembly 12 where seal 96 is disposed radially between axle 26 and the stationary case 36 of differential 20. The biasing member 192 of axle assembly 112 is outboard of seal 196, which differs from axle assembly 12 where biasing member 92 is positioned inboard of seal 96. Biasing member 192 can be a coil spring as shown in FIGS. 7 and 8. In other embodiments (not shown), biasing member 192 can be other types of resilient members, for example a disc spring such as a Belleville washer.

Figure 9:
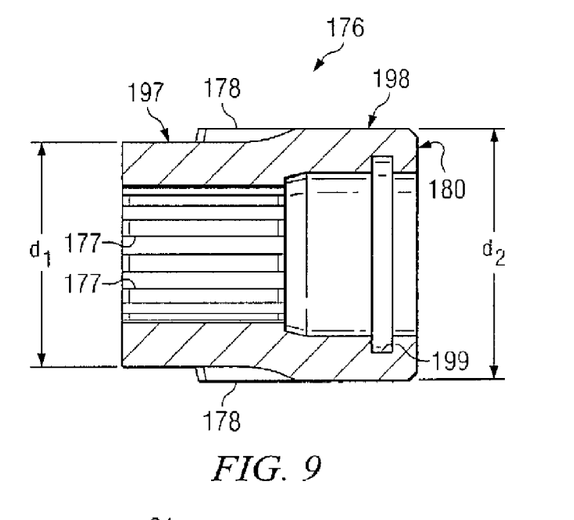
FIG. 9 is an enlarged cross-sectional view of the lock sleeve shown in FIGS. 7 and 8.

The biasing member 192 can be positioned laterally between a ring 127 of axle 126 and the lock sleeve 176 of the differential lock mechanism 174. Ring 127 is outboard of lock sleeve 176 and biases, or urges, lock sleeve 176 toward a sleeve 186 of a rotatable carrier 138 of differential 120. Lock sleeve 176 can be disposed in contacting engagement with the rotatable carrier 138. Lock sleeve 176 is co-axially disposed about axle 126 and can include a first portion 197 having an outside diameter $d_1$ and a second portion 198 having an outside diameter $d_2$ as shown in FIG. 9. Diameter $d_2$ can be greater than diameter $d_1$. The lock sleeve 176 can include a groove 199 formed therein, which can be proximate an end 180 of lock sleeve 176. The groove 199 can be used to retain a seal, for example an O-ring.

The first portion 197 of lock sleeve 176 can include a plurality of circumferentially spaced internal splines 177 (FIG. 9), which can engage external splines 181 of axle 126, and a plurality of circumferentially spaced external splines 178 (FIG. 9) that can engage the lock collar 182 of the differential lock mechanism 174. The second portion 198 of lock sleeve 176 can be free of splines as shown in FIG. 9 and can interface with seal 196 as shown in FIGS. 7 and 8. Lock collar 182 can include a plurality of circumferentially spaced internal splines similar to or the same as splines 83 of lock collar 82, which can mesh with the external splines 178 of lock sleeve 176. Accordingly, lock collar 182 is laterally movable relative to the lock sleeve 176 of the differential lock mechanism 174 and the sleeve 186 of the rotatable carrier 138 between an outboard position shown in FIG. 7 and an inboard position shown in FIG. 8. Lock collar 182 can be moved between the outboard and inboard positions by the lock fork 188 that can be the same or similar to lock fork 88 described previously. Lock fork 188 can be actuated in the same manner as lock fork 88 as described previously.

When lock collar 182 is in the outboard position shown in FIG. 7, lock collar 182 is splined to lock sleeve 176 but is disengaged from the rotatable carrier 138 of differential 120 so that differential 120 is unlocked. Accordingly, the lock sleeve 176, the right rear axle 126 and the left rear axle 124 are free to rotate relative to the rotatable carrier 138 of differential 120. Also, axles 124 and 126 are free to rotate relative to one another, which permits the corresponding wheels of the vehicle in which axle assembly 112 is used, to rotate relative to one another. When lock collar 182 is in the inboard position shown in FIG. 8, lock collar 182 is splined to both the lock sleeve 176 of the differential lock mechanism 174 and the sleeve 186 of the rotatable carrier 138 of axle assembly 112. Accordingly, when the lock collar 182 is in the inboard position shown in FIG. 8, the differential 120 is locked and lock sleeve 176, rotatable carrier 138 and axle 126 rotate at the same speed during operation of the corresponding vehicle, such as vehicle 10. Additionally, when lock collar 182 is in the inboard position, the left rear axle 124 is prevented from rotating relative to the right rear axle 126 so that axles 124 and 126 and both of the rear wheels of the vehicle rotate at the same speed during operation of the vehicle.

Figure 10:
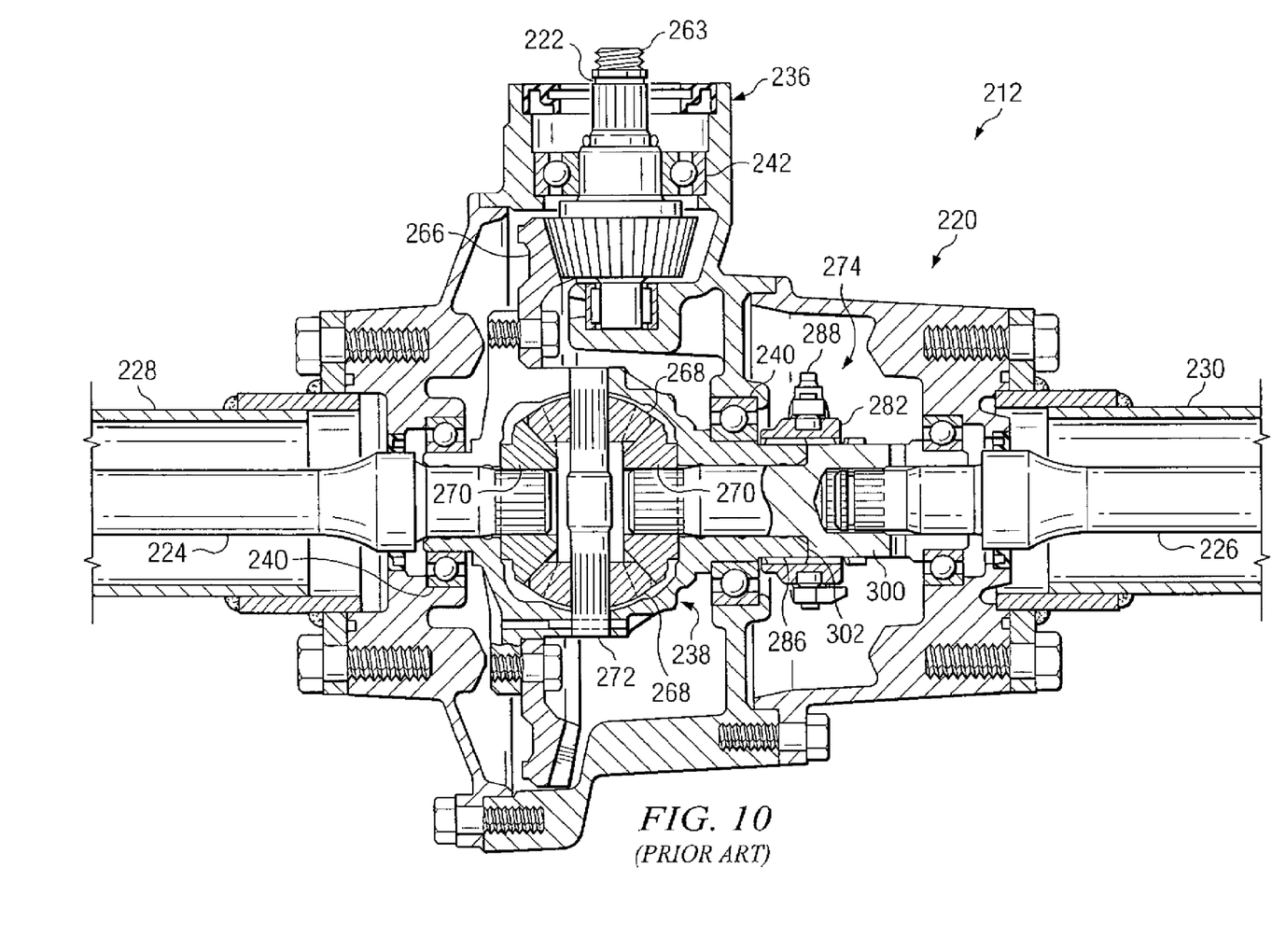
FIG. 10 is a cross-sectional view of a Prior Art axle assembly of a vehicle.

Prior art FIG. 10 illustrates a conventional axle assembly 212, which can be a rear axle assembly. Axle assembly 212 can be similar to, or the same as, axle assemblies 12 and 112 in many respects. For example, axle assembly 212 includes a differential 220, an input member 222 that can be coupled, at an end 263, to a driveshaft and rotatable axles 224 and 226. Axles 224 and 226 can be disposed within axle tubes 228 and 230, respectively. The differential 220 includes a stationary case 236 and a rotatable carrier 238 that can be journalled within the stationary case 236 by a pair of bearings 240. Input member 222 can be journalled within stationary case 236 by a bearing 242. Torque can be transferred from a vehicle driveshaft (not shown) to left rear axle 224 and right rear axle 226 via input member 222, ring gear 266, pinion gears 268 which can be secured to the rotatable carrier 238 via shaft 272, and side gears 270 which are secured to respective ones of the axles 224 and 226.

However, the differential lock mechanism 274 included in axle assembly 212 is significantly different than the differential lock mechanisms 74 and 174 of axle assemblies 12 and 112, respectively. Differential lock mechanism 274 includes a lock collar 282 that can be similar to, or the same as, lock collars 82 and 182, and further includes a lock fork 288 that can be the similar to, or the same as, lock forks 88 and 188 described previously. However, the differential lock mechanism 274 does not include a lock sleeve in contrast to axle assembly 12, which includes lock sleeve 76, and axle assembly 112 that includes lock sleeve 176. Furthermore, the conventional differential lock mechanism 274 does not include a biasing member, in contrast to axle assembly 12 that includes biasing member 92 and axle assembly 112 that includes biasing member 192.

The right rear axle 226 of axle assembly 212 includes a shoulder 300. Nominally, the shoulder 300 can be positioned laterally in close proximity to, or in contacting engagement with a sleeve 286 of the rotatable carrier 238 of differential 220 at interface 302 shown in FIG. 10. However, as a result of the manufacturing tolerances associated with multiple components of axle assembly 212, a lateral gap (not shown) can exist between the sleeve 286 of the rotatable carrier 238 of differential 220 and the shoulder 300 of axle 226, which is undesirable for the following reasons. When shoulder 300 of axle 226 is in contacting engagement with sleeve 286 of the rotatable carrier 238 of differential 220, differential 220 can be locked to prevent axles 224 and 226 from rotating relative to one another by moving lock collar 282 to an inboard position shown in FIG. 10, using lock fork 288. When lock collar 282 is in the inboard position and differential 220 is locked, the left rear axle 224, the right rear axle 226 and the rotatable carrier 238 of differential 220 are forced to rotate at the same speed during operation of the associated vehicle. However, the cumulative stack-up tolerances of multiple parts of axle assembly 212 can create a lateral gap (not shown) between the sleeve 286 of rotatable carrier 238 and the shoulder 300 of axle 226 that is large enough to prevent the desired extent of lateral engagement of lock collar 282 with both rotatable carrier 238 and axle 226, which can compromise the ability to lock differential 220.

The presence of lock sleeve 76 and biasing member 92 in axle assembly 12 avoids the foregoing problem associated with axle assembly 212, thereby ensuring proper engagement of lock collar 82 with both the sleeve 86 of rotatable carrier 38 of differential 20 and the right rear axle 26. This configuration overcomes the cumulative stack-up tolerances of multiple parts in axle assembly 12 so that lock sleeve 76 can remain in constant contact with sleeve 86 of rotatable carrier 38, which ensures the ability to lock differential 20. Similarly, the presence of lock sleeve 176 and biasing member 192 in axle assembly 112 also overcomes the previously described problem associated with conventional axle assembly 212 and ensures the ability to lock differential 120 of axle assembly 112. The internal splines 77, 177 of lock sleeves 76, 176 respectively, and the external splines 78, 178 of lock sleeves 76, 176, respectively are relatively easy to form. Accordingly, the manufacture of lock sleeves 76 and 176 is cost effective.

While the inventive principles have been illustrated by the description of various embodiments thereof, and while the embodiments have been described in considerable detail, it is not intended to restrict or in anyway limit the scope of the appended claims to such detail. Additional advantages and modifications will be readily apparent to those skilled in the art. The invention in its broader aspects is therefore not limited to the specific details, representative apparatus and methods and illustrative examples shown and described. Accordingly, departures may be made from such details without departing from the scope and spirit of the general inventive principles.

What is claimed is:

1. A differential lock mechanism for use in an axle assembly having a differential, an input member and first and second axles, the differential having a stationary case, a rotatable carrier journalled within the stationary case, the rotatable carrier being coupled to the input member and the first and second axles, the differential lock mechanism comprising:
a lock sleeve co-axially disposed about the first axle, the lock sleeve being laterally movable relative to the first axle and rotatable with the first axle;
a lock collar co-axially disposed about the lock sleeve, the lock collar being laterally movable relative to the lock sleeve between outboard and inboard positions;
a biasing member effective for biasing the lock sleeve toward the rotatable carrier; and
a lock fork engaged with the lock collar, the lock fork being operable for moving the lock collar between the outboard and inboard positions; wherein
the lock collar is disengaged with the rotatable carrier when the lock collar is in the outboard position;
the lock sleeve, the first axle and the second axle are free to rotate relative to the rotatable carrier when the lock collar is in the outboard position;
the lock collar is engaged with both the rotatable carrier and the lock sleeve when the lock collar is in the inboard position; and
the lock sleeve, the first axle, the second axle and the rotatable carrier are operably rotatable at the same speed when the lock collar is in the inboard position.

2. The differential lock mechanism of claim 1, wherein:
the biasing member comprises a spring.

3. The differential lock mechanism of claim 2, wherein:
the spring is a coil spring.

4. The differential lock mechanism of claim 1, wherein the differential further includes a seal disposed outboard of the rotatable carrier and radially between the first axle and the stationary case, wherein:
the biasing member is inboard of the seal.

5. The differential lock mechanism of claim 1, wherein the differential further includes a seal disposed outboard of the rotatable carrier and radially between the lock sleeve and the stationary case; wherein:
the biasing member is outboard of the seal.

6. The differential lock mechanism of claim 4, wherein the first axle includes a shoulder having an inboard-facing surface positioned inboard of the seal, wherein:
the lock sleeve is inboard of the shoulder of the first axle; and
the biasing member extends between and is in contacting engagement with the lock sleeve and the inboard-facing surface of the shoulder of the first axle.

7. The differential lock mechanism of claim 5, wherein the first axle includes a ring positioned outboard of the seal, the ring having an inboard-facing surface, wherein:
the lock sleeve is inboard of the ring of the first axle; and
the biasing member extends between and is in contacting engagement with the lock sleeve and the inboard-facing surface of the ring of the first axle.

8. The differential lock mechanism of claim 7, wherein:
the lock sleeve comprises a first portion having a first outside diameter, the first portion being splined to the lock collar and the first axle;
the lock sleeve further comprises a second portion having a second outside diameter, the second portion of the lock sleeve being free of splines; and
the second portion of the lock sleeve interfaces with the seal of the differential.

9. The differential lock mechanism of claim 8, wherein:
the second outside diameter of the second portion of the lock sleeve is greater than the first outside diameter of the first portion of the lock sleeve.

10. The differential lock mechanism of claim 1, wherein:
the lock sleeve is splined to the first axle and the lock collar.

11. The differential lock mechanism of claim 1, wherein:
the lock collar comprises a circumferentially extending groove formed therein; and
the lock fork comprises a plurality of radially inwardly extending protrusions, the protrusions being disposed within the circumferentially extending groove of the lock collar.

12. An axle assembly comprising:
an input member;
first and second axles;
a differential coupled with the input member and the first and second axles, the differential being operable for transferring torque from the input member to the first and second axles, the differential comprising a stationary case and a rotatable carrier journalled within the stationary case; and
a differential lock mechanism comprising:
a lock sleeve co-axially disposed about the first axle, the lock sleeve being laterally movable relative to the first axle and rotatable with the first axle;
a lock collar co-axially disposed about the lock sleeve, the lock collar being laterally movable relative to the lock sleeve between outboard and inboard positions;
a biasing member effective for biasing the lock sleeve toward the rotatable carrier; and
a lock fork engaged with the lock collar, the lock fork being operable for moving the lock collar between the outboard and inboard positions; wherein
the lock collar is disengaged with the rotatable carrier when the lock collar is in the outboard position;
the lock sleeve, the first axle and the second axle are free to rotate relative to the rotatable carrier when the lock collar is in the outboard position;
the lock collar is engaged with both the rotatable carrier and the lock sleeve when the lock collar is in the inboard position; and
the lock sleeve, the first and second axles and the rotatable carrier are operably rotatable at the same speed when the lock collar is in the inboard position.

13. The axle assembly of claim 12, wherein:
the biasing member comprises a spring.

14. The axle assembly of claim 13, wherein:
the spring is a coil spring.

15. The axle assembly of claim 12, wherein:
the differential further includes a seal disposed outboard of the rotatable carrier and radially between the first axle and the stationary case; and
the biasing member is inboard of the seal.

16. The axle assembly of claim 12, wherein:
the differential further includes a seal disposed outboard of the rotatable carrier and radially between the lock sleeve and the stationary case; and
the biasing member is outboard of the seal.

17. An axle assembly comprising:
first and second axles;
a differential coupled with the first and second axles, the differential comprising a stationary case and a rotatable carrier journalled within the stationary case; and
a differential lock mechanism comprising:

a lock sleeve co-axially disposed about the first axle, the lock sleeve being laterally movable relative to the first axle and rotatable with the first axle;

a lock collar co-axially disposed about the lock sleeve, the lock collar being laterally movable relative to the lock sleeve between outboard and inboard positions;

a biasing member effective for biasing the lock sleeve toward the rotatable carrier; and a lock fork engaged with the lock collar, the lock fork being operable for moving the lock collar between the outboard and inboard positions; and wherein the lock collar is disengaged with the rotatable carrier when the lock collar is in the outboard position and is engaged with both the rotatable carrier and the lock sleeve when the lock collar is in the inboard position.

18. The axle assembly of claim 17, wherein:
the biasing member comprises a spring.

19. The axle assembly of claim 18, wherein:
the spring is a coil spring.

20. The axle assembly of claim 17, wherein:
the differential further includes a seal disposed outboard of the rotatable carrier and radially between the first axle and the stationary case; and
the biasing member is inboard of the seal.

21. The axle assembly of claim 17, wherein:
the differential further includes a seal disposed outboard of the rotatable carrier and radially between the lock sleeve and the stationary case; and
the biasing member is outboard of the seal.

\* \* \* \* \*